United States Patent [19]

Okada et al.

[11] Patent Number: 5,396,225
[45] Date of Patent: Mar. 7, 1995

[54] COMMUNICATION ADAPTOR FOR GAME SET

[75] Inventors: Satoru Okada, Kyoto; Hitoshi Yamagami, Nara; Katsuya Yamano, Kyoto, all of Japan

[73] Assignee: Nintendo Company Limited, Kyoto, Japan

[21] Appl. No.: 257,732

[22] Filed: Jun. 9, 1994

Related U.S. Application Data

[63] Continuation of Ser. No. 789,691, Nov. 8, 1991, abandoned.

[30] Foreign Application Priority Data

Nov. 8, 1990 [JP] Japan .................. 2-304850

[51] Int. Cl.$^6$ ................................. H04Q 1/00
[52] U.S. Cl. .................. 340/825.21; 273/148 B; 273/85 G
[58] Field of Search .......... 340/825.21, 323 R, 825.15; 345/1; 273/148 B, 434, 435, 460, 85 G; 364/410

[56] References Cited

U.S. PATENT DOCUMENTS

| | | | |
|---|---|---|---|
| 2,994,531 | 8/1961 | Eberwein . | |
| 3,008,712 | 11/1961 | Konopka | 273/445 |
| 3,078,093 | 2/1963 | Hotkins et al. | 273/445 |
| 3,149,841 | 9/1964 | Hullman | 273/433 |
| 3,453,384 | 7/1969 | Donner et al. | 340/717 |
| 3,654,392 | 4/1972 | Beinhocker et al. | 379/99 |
| 3,779,553 | 12/1973 | Sector | 273/237 |
| 4,051,605 | 10/1977 | Toal et al. | 434/201 |
| 4,121,283 | 10/1978 | Walker | 395/275 |
| 4,126,851 | 11/1978 | Okor | 273/85 G |
| 4,141,548 | 2/1979 | Everton | 273/460 |
| 4,193,598 | 3/1980 | Freese | 273/313 |
| 4,200,867 | 4/1980 | Hill | 345/186 |
| 4,247,106 | 1/1981 | Jeffers et al. | 273/85 G |
| 4,322,074 | 3/1982 | James et al. | 273/1 |
| 4,335,809 | 6/1982 | Wain | 194/239 |
| 4,339,798 | 7/1982 | Hedges et al. | 364/412 |
| 4,372,558 | 2/1983 | Shimamoto et al. | 273/238 |
| 4,389,048 | 6/1983 | Burgess | 273/121 A |
| 4,494,197 | 1/1985 | Troy et al. | 364/412 |
| 4,517,656 | 5/1985 | Solimento et al. | 364/900 |
| 4,521,014 | 6/1985 | Sitrick | 271/1 |
| 4,534,557 | 8/1985 | Bigelow et al. | 273/55 A |
| 4,553,222 | 11/1985 | Kurland et al. | 364/401 |
| 4,564,923 | 1/1986 | Nakano | 273/85 G |
| 4,570,930 | 2/1986 | Matheson | 273/1 |
| 4,572,509 | 2/1986 | Sitrick | 273/85 |
| 4,588,187 | 5/1986 | Dell | 273/148 B |
| 4,965,559 | 10/1990 | Dye | 340/717 |
| 5,095,798 | 3/1992 | Okada et al. | 364/410 |
| 5,184,830 | 2/1993 | Okada et al. | 273/433 |

FOREIGN PATENT DOCUMENTS

| | | |
|---|---|---|
| 0335848 | 10/1989 | European Pat. Off. . |
| 1513545 | 7/1969 | Germany . |
| 2724153 | 8/1978 | Germany . |
| 58-190470 | 11/1983 | Japan . |
| 2017988 | 10/1979 | United Kingdom . |
| 1556785 | 11/1979 | United Kingdom . |
| 2026872A | 2/1980 | United Kingdom . |
| 2102167A | 1/1983 | United Kingdom . |
| 2136303A | 9/1984 | United Kingdom . |
| WO82/03318 | 10/1982 | WIPO . |

OTHER PUBLICATIONS

"Combat: A tele-Game for Two", George Stewart, *Byte Publications, Inc.*, Dec. 1981, three pages.
"The Xerox Alto Computer", Thomas A. Wadlow, *Byte Publications, Inc.*, Sep. 1981, six pages.
"Multimachine Games", Ken Wasserman and Tim Stryker, *Byte Publications, Inc.*, Dec. 1980, 8 pages.
"Phone Games", *Newsbriefs*, Apr. 7, 1983.

*Primary Examiner*—Donald J. Yusko
*Assistant Examiner*—Edwin C. Holloway, III
*Attorney, Agent, or Firm*—Nixon & Vanderhye

[57] ABSTRACT

A communication adapter which is used with a plurality of game sets for transmitting and receiving data related to the game states of the game sets. Each game set including a serial interface and a buffer memory for temporarily storing transmit/receive data. The adapter including: a housing; a connection terminal for each game set; data input, data output and clock output ports, a clock signal generator, format converter and transmit/receive storage means. The clock signal generating means applies the same clock signal used for data communication with the game sets to each clock output port so that data to be transmitted to each game set and data received from each game set is synchronized with the clock signal whereby reliable communication is obtained with two or more game sets without the use of modems.

8 Claims, 20 Drawing Sheets

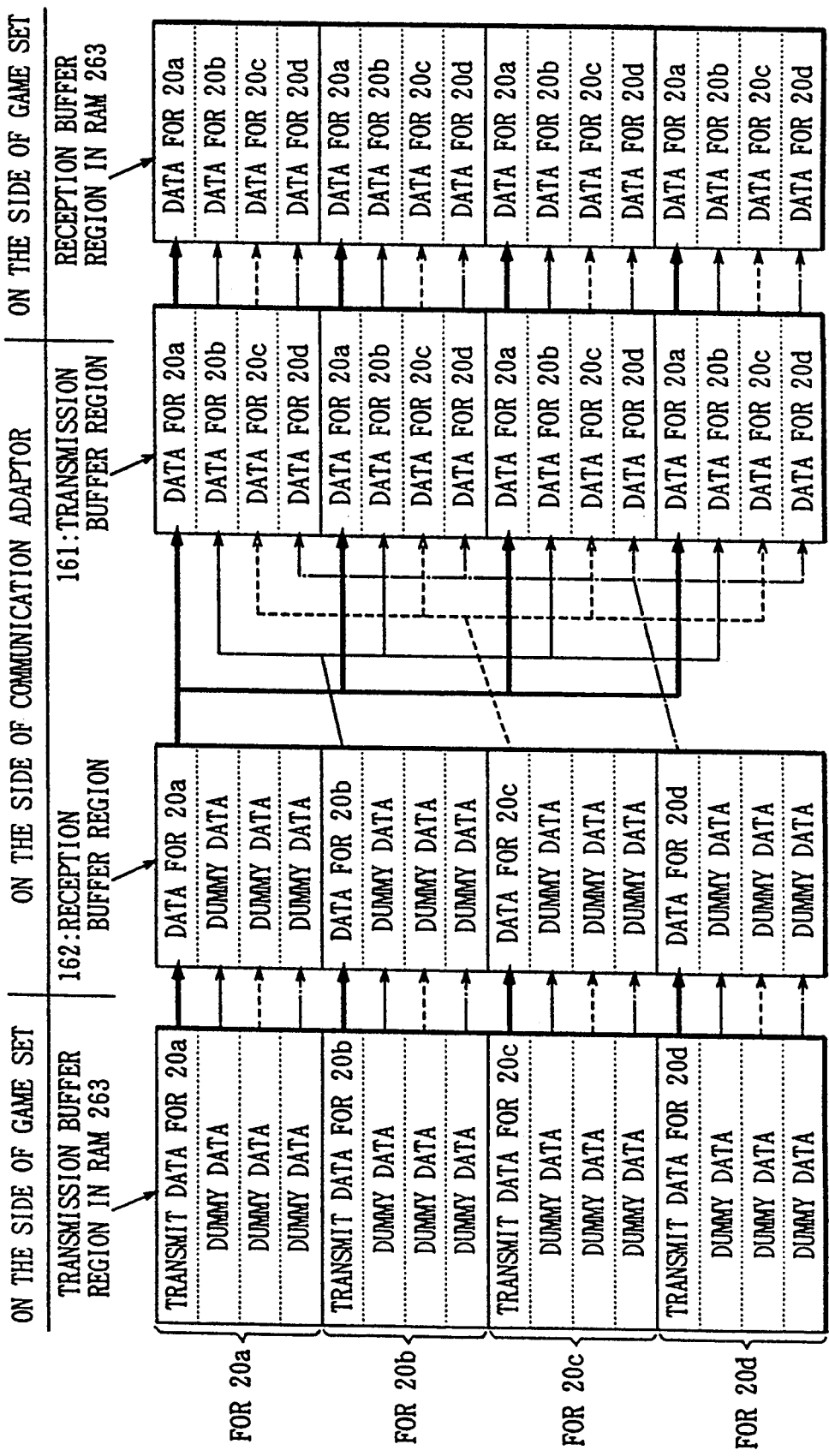
F I G. 6 B

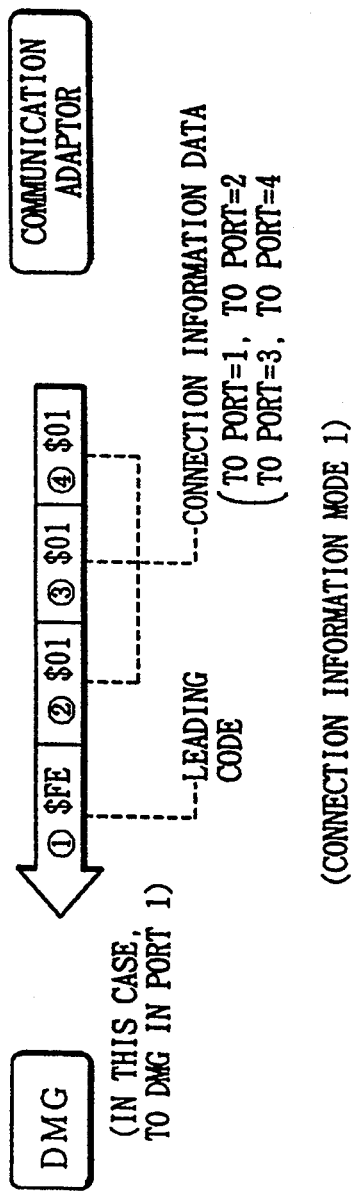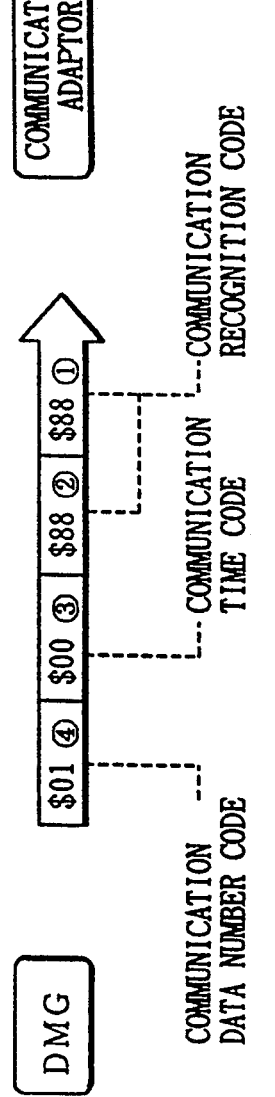

FIG. 9C

| CONNECTING STATE | | | | NUMBER OF PORT | | | | |
|---|---|---|---|---|---|---|---|---|
| D7 | D6 | D5 | D4 | D3 | D2 | D1 | D0 | |
| 0 | 0 | 0 | 0 | 0 | 0 | 0 | 1 | → TO DMG IN PORT 1 |
| 0 | 0 | 0 | 0 | 0 | 0 | 1 | 0 | → TO DMG IN PORT 2 |
| 0 | 0 | 0 | 0 | 0 | 1 | 1 | 1 | → TO DMG IN PORT 3 |
| 0 | 0 | 0 | 0 | 0 | 1 | 0 | 0 | → TO DMG IN PORT 4 |

PORT 1
PORT 2  } PRESENCE OR ABSENCE OF
PORT 3     CONNECTION OF EACH DMG
PORT 4         0:ABSENCE  1:PRESENCE (BIT CONFIGURATION OF CONNECTION INFORMATION DATA)

(START MODE 1)

(START MODE 2)

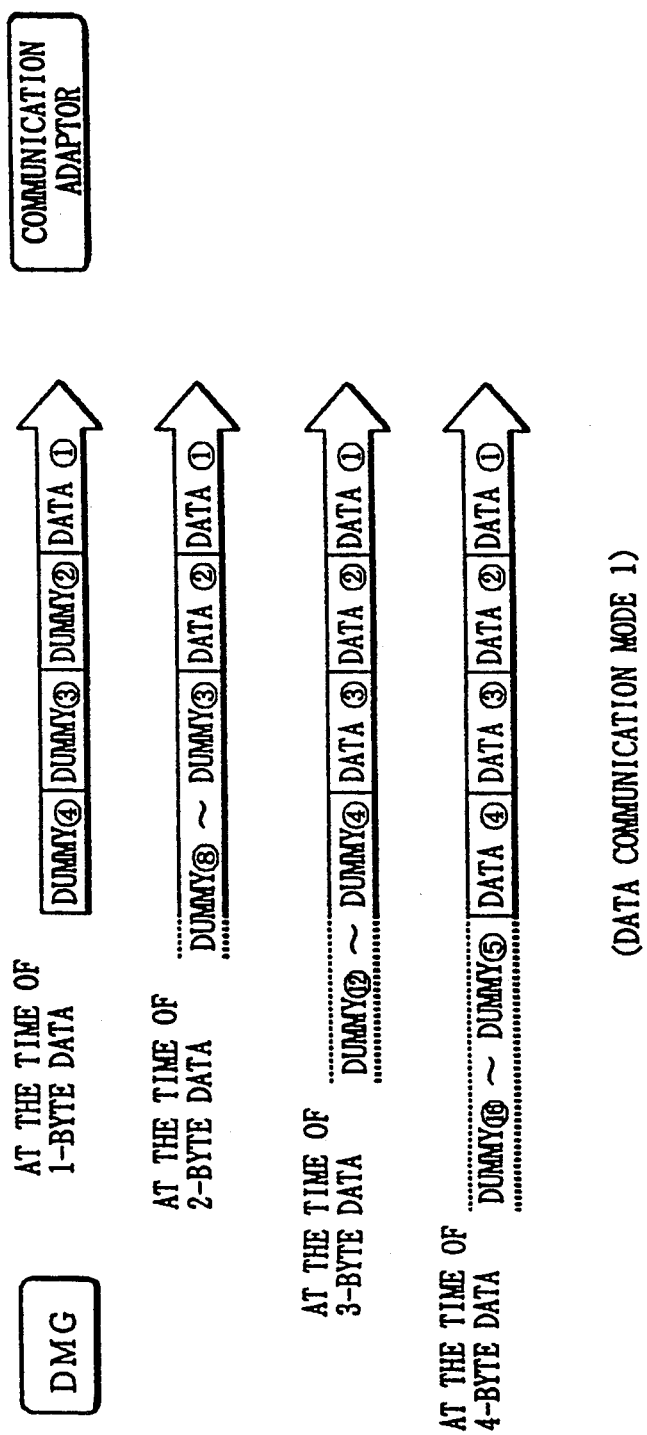

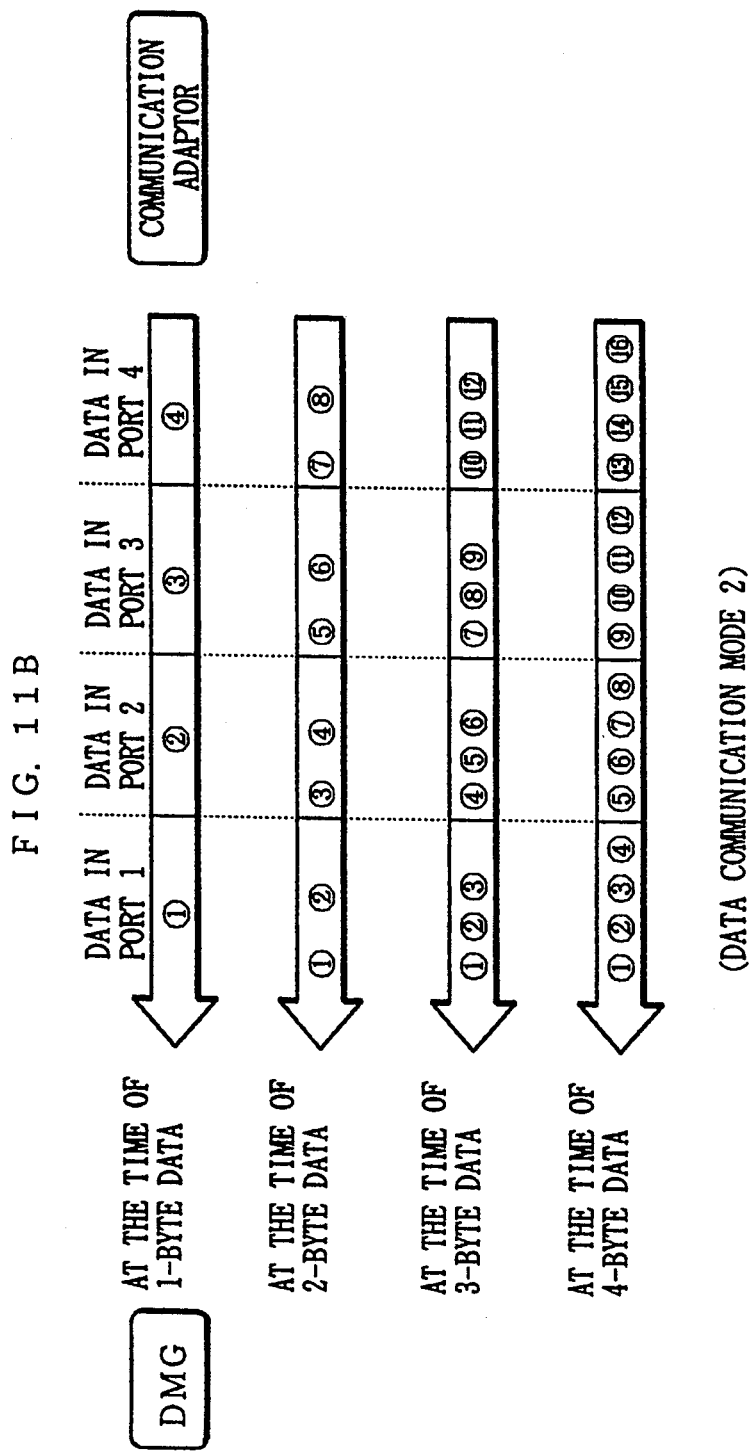

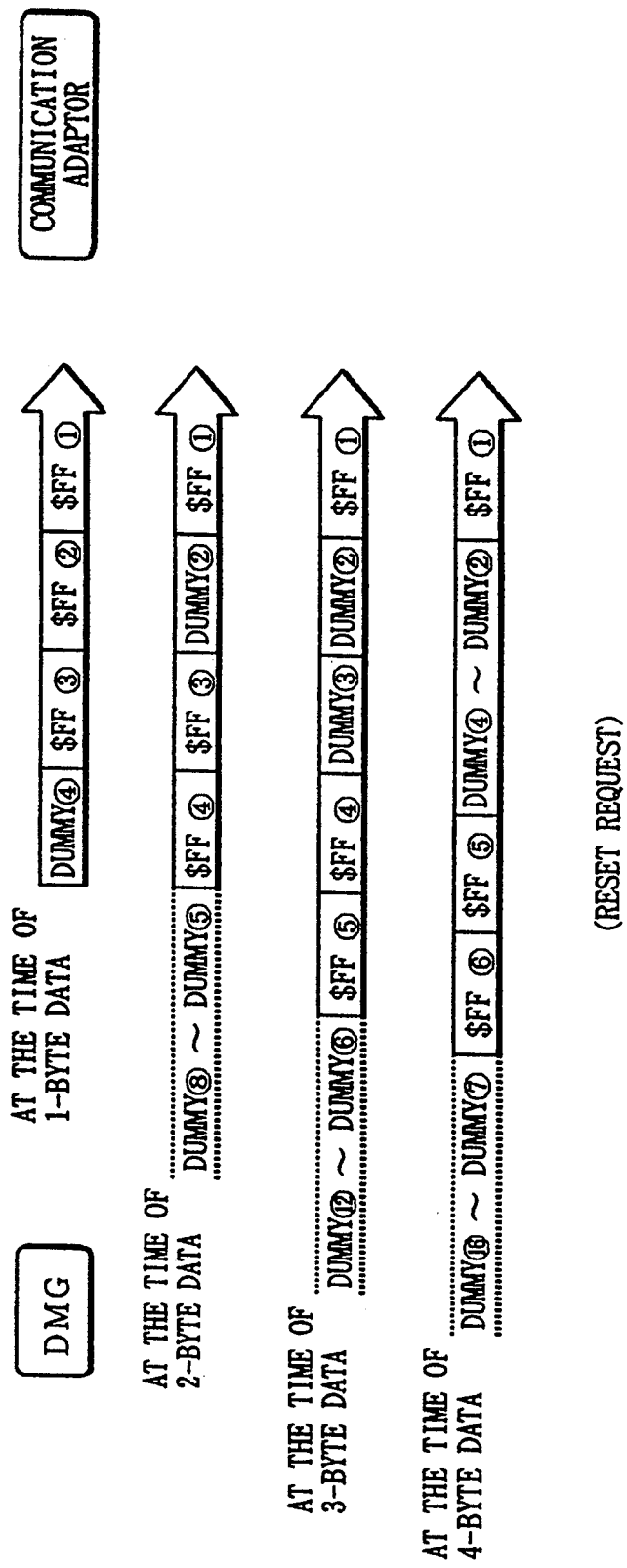

[www.freepatentsonline.com](http://www.freepatentsonline.com)

COMMUNICATION ADAPTOR FOR GAME SET

This is a continuation of application Ser. No. 07/789,691, filed Nov. 8, 1991, now abandoned.

BACKGROUND OF THE INVENTION

1. Field of the Invention

The present invention relates generally to a communication adaptor for a game set, and more particularly, to a communication adaptor for a game set used for transmitting and receiving data related to a game. The game may, for example, involve simultaneous play (e.g., doing battle) with a plurality of game sets being connected thereto.

2. Description of the Prior Art

In the case of data communication using personal computers, communication has been conventionally established through a long-distance transmission line and exchange. In such a system, a transmission error is liable to occur. Consequently, high-cost modems for transmitting and receiving data and controlling the error in accordance with the transmission control procedure have been used.

The applicant of the present application has proposed as a technique for playing a battle game between two game sets by transmitting and receiving data related to the game with two portable dot matrix liquid crystal game sets (trade name "GAME BOY") being connected to each other.

In the technique for establishing data communication using modems, data can be transmitted accurately but at high cost. Accordingly, it is not suitable for transmission of data on a battle game in a game set where cost reduction is important. In addition, if an attempt is made to reduce the transmission error using error control techniques or the like, significant processing time is required. Consequently, the time required to perform game processing is restricted, which can limit the battle game programming and impact the fun of the game. Furthermore, in such a system, one modem is connected to each of the personal computers, and the modem and the personal computer establish one-to-one communication. Accordingly, it is impossible for three or more persons to play the battle game.

On the other hand, in the above-described technique for playing a battle game with two portable dot matrix liquid crystal game sets being connected to each other, data can be transmitted at low cost. In this system, when data must be transferred, problems arise during the game. For example, if data is sent from one game set to the other game set, further data may need to be transferred before the next vertical blanking period. However, the previously transferred data may no longer be preserved so that data transmission may not, in some cases, be accurately made. The reason for this is that the two game sets differ in the progress of the game as well as the timing when vertical blanking occurs. Furthermore, in this technique, the battle game can be only enjoyed between two game sets.

Accordingly, game play by three persons with game sets (for example, mah-jong or a card) cannot be achieved.

SUMMARY OF THE INVENTION

Therefore, a primary object of the present invention is to provide a new low-cost communication adaptor for a game set of simple construction such that a plurality of players communicate and enjoy a battle game.

Briefly stated, the present invention provides a communication adaptor for a game set (which corresponds to 10 in the embodiment), which is used with a plurality of game sets for playing a game for transmitting and receiving data related to the game states of the other game sets between a plurality of game sets. Each of the game sets 20a to 20d is provided with a first serial interface 26 for inputting and outputting game data and a buffer memory 263 for temporarily storing transmit/receive data. The interface ensures that the game sets are appropriately connected to one another.

The communication adaptor 10 for a game set comprises a housing 11, a plurality of second connecting ports 13a to 13d, a data input port 181, a data output port 182, a clock output port 183, clock signal generating means 14 and 17, format converting means 14 and 15, receive data writing means 14 and 15, and transmit data supplying means 14 and 15.

Each of the second connecting ports is provided for the housing and includes at least a first terminal, a second terminal and a third terminal, the second connecting port being connected to the first serial interface in each of the game sets. The data input port stores bits whose number corresponds to the number of a plurality of connectors so as to store serial data input from the connectors, the bits stored corresponding to the bits being respectively connected to the first terminals included in the second connecting ports. The data output port stores bits whose number correspond to the number of the plurality of second connecting ports, the bits stored corresponding to the bits being respectively connected to the second terminals included in the second connecting ports. The clock output port stores bits whose number corresponds to the number of a plurality of connectors such that it can generate clock signals required for the connectors to input and output a signal, the bits stored corresponding to the bits being respectively connected to the third terminals included in the second connecting ports.

The clock signal generating means applies the same clock signal used for data communication with the game sets to each of the bits in the clock output port in synchronization with the transmission/reception timing. The transmit/receive data temporary storing means stores transmit data on the game to be transmitted to each of the game sets and receives data on the game received from each of the game sets in synchronization with the clock signal. The format conversion means converts the serially arranged receive data received from each of the game sets into bit parallel data or converts the bit parallel data to be transmitted into serial data. The receive data writing means writes data into the transmit/receive data temporary storing means corresponding to the data received in the data input port from each of the game sets after being converted by the format converting means in synchronization with the clock signal. The transmit data supplying means reads out the transmit data stored in the transmit/receive data storing means to supply the same to the data output port after being converted by the format converting means so as to transmit the transmit data stored in the transmit/receive data temporary storing means to each of the game sets in synchronization with the clock signal. That is, the transmit data supplying means outputs the transmit data by performing the reverse work operations to that performed by the receive data writing means.

According to the present invention, data related to a battle game can be reliably transmitted between a communication adaptor and a plurality of game sets in a simple circuit without using high-cost modems. Further, the number of game sets which can be connected to the communication adaptor can be increased. Accordingly, it is possible to diversify, for example, the type of battle game to which the present invention is applied.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B are diagrams illustrating a state where data communication is established between the communication adaptor and the game sets, where FIG. 6A shows the various operation modes of the communication adaptor, and FIG. 6B shows the relationship between each of RAM areas storing transmit/receive data and the flow of data in the state where data communication is established;

FIG. 7A shows an operation where power is turned on (at the start time), FIG. 7B shows an operation at the time of a timer interruption, FIG. 7C shows an operation at the time of a connection information mode, FIG. 7D shows an operation at the time of a start mode, FIG. 7E shows an operation at the time of a data communication mode, and FIG. 7F shows an operation at the time of a reset mode;

FIG. 8A shows an operation of a main program, and FIG. 8B shows an operation at the time of an SIO interruption; and FIGS. 9A to 12B are illustrations of a data format for each operation mode, where FIGS. 9A to 9C show a data format in a connection information mode, FIGS. 11A to 11B show a data format in a data communication mode, and FIGS. 12A and 12B show a data format in a reset mode.

DESCRIPTION OF THE PREFERRED EMBODIMENTS

Figure 1:
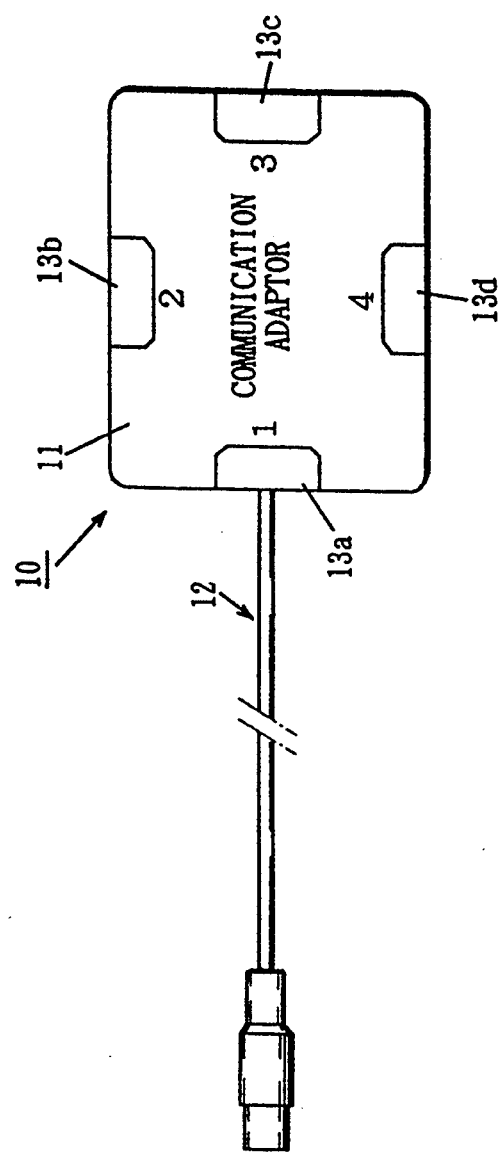
FIG. 1 is a diagram showing the communication adaptor for a game set according to one embodiment of the present invention.
Figure 2:
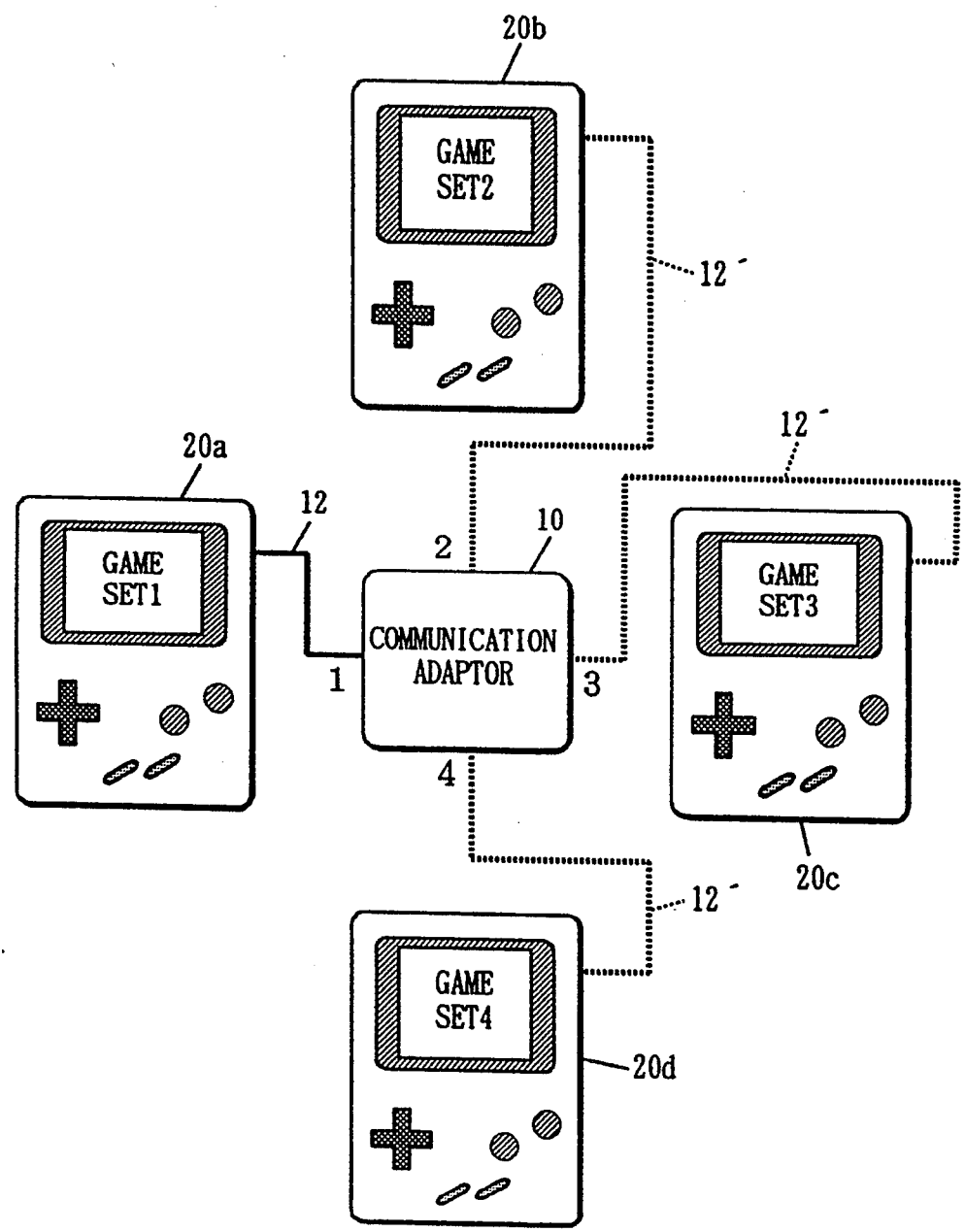
FIG. 2 is an illustration of communication adaptor in use.

FIG. 1 is a diagram showing a communication adaptor for a game set (hereinafter referred to as "communication adaptor") according to one embodiment of the present invention. The adaptor 10 comprises a housing 11 in the shape of a polygon having not less than three sides (for example, a rectangle or a square in the drawings). A cord with a plug 12 for connecting the communication adaptor 10 to a certain game set (e.g., see FIG. 2, and note that the game set may, in some cases, be illustrated as "DMG" because it uses a dot matrix liquid crystal display) extends out of the side surface of the housing 11 through a connecting terminal 13a. As shown in FIG. 2, connectors 13b to 13d for connecting the communication adaptor 10 to a plurality of other game sets 20b to 20d by a cord 12' are mounted on the other side surfaces of the housing 11. Each of the connecting terminal 13a and the connectors 13b to 13d includes, for example, first and second terminals for serially transmitting transmit/receive data on one bit basis and a third terminal for transmitting a clock signal, and includes two terminals, that is, a plus terminal of the power supply and a minus terminal thereof such that it is supplied with power from any one of the game sets as required.

When a plurality of players are playing, for example, a battle game, connection is made as shown in FIG. 2, and data required for the battle game in the game sets 20a to 20d is transmitted to the game sets through the communication adaptor 10. Consequently, the communication adaptor 10 has a data transmitting and receiving function.

In FIG. 2, four game sets are connected to the communication adaptor 10, assuming a case where a maximum of four persons simultaneously play the battle game. The connector 13d is not required if the communication adaptor is to be used for a maximum of three persons. In addition, if five or more persons are playing the battle game, connectors whose number correspond to the number of game sets to be connected are added. In this case, the housing 11 may be of a pentagonal shape or one in an oblong shape having one side provided with a plurality of connectors. Furthermore, the cord with a plug 12 for the first game set 20a may be connected for the other game sets 20b to 20d in place of the connectors. Additionally, since in this example, the communication adaptor 10 has no power by itself, a cord with a plug through the connecting terminal 13a for supplying power to the communication adaptor 10 is connected to one game set 20a. If power is supplied to the communication adaptor 10 by itself, however, a connector may be provided in place of the connecting terminal 13a and the communication adaptor 10 may be connected to the game set 20a using a cord 12'.

Figure 3:
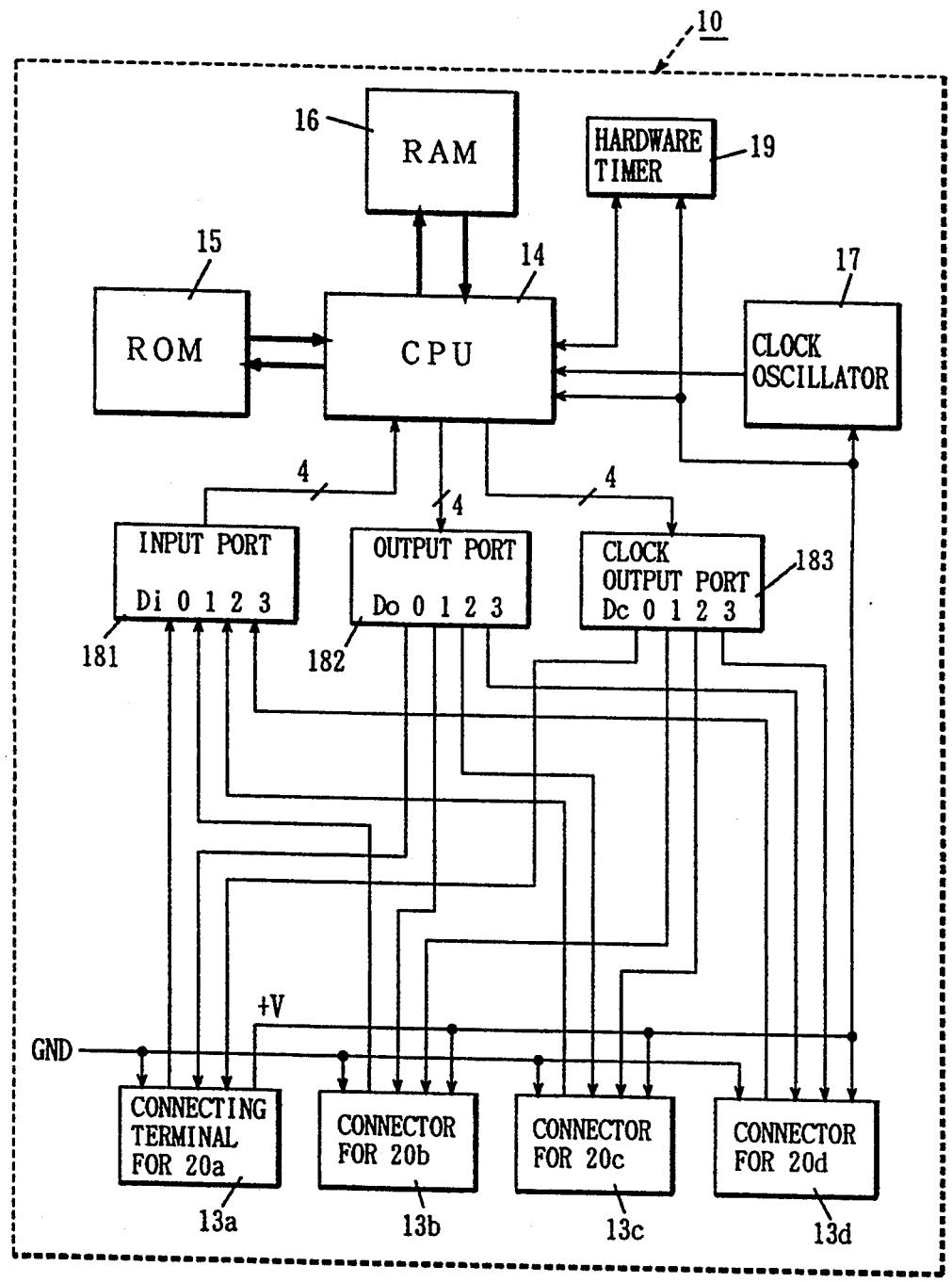
FIG. 3 is a block diagram showing one embodiment of the communication adaptor.

FIG. 3 is a block diagram showing one embodiment of the communication adaptor 10. The communication adaptor 10 comprises a microprocessor (hereinafter referred to as "CPU") 14. A read-only memory (hereinafter referred to as "ROM") 15 and a random access memory (hereinafter referred to as "RAM").16 are connected to the CPU 14 through a data bus and an address bus. The ROM 15 stores program data for performing the operations defined by the flow charts shown in FIGS. 7A to 7F as described later.

Figure 4:
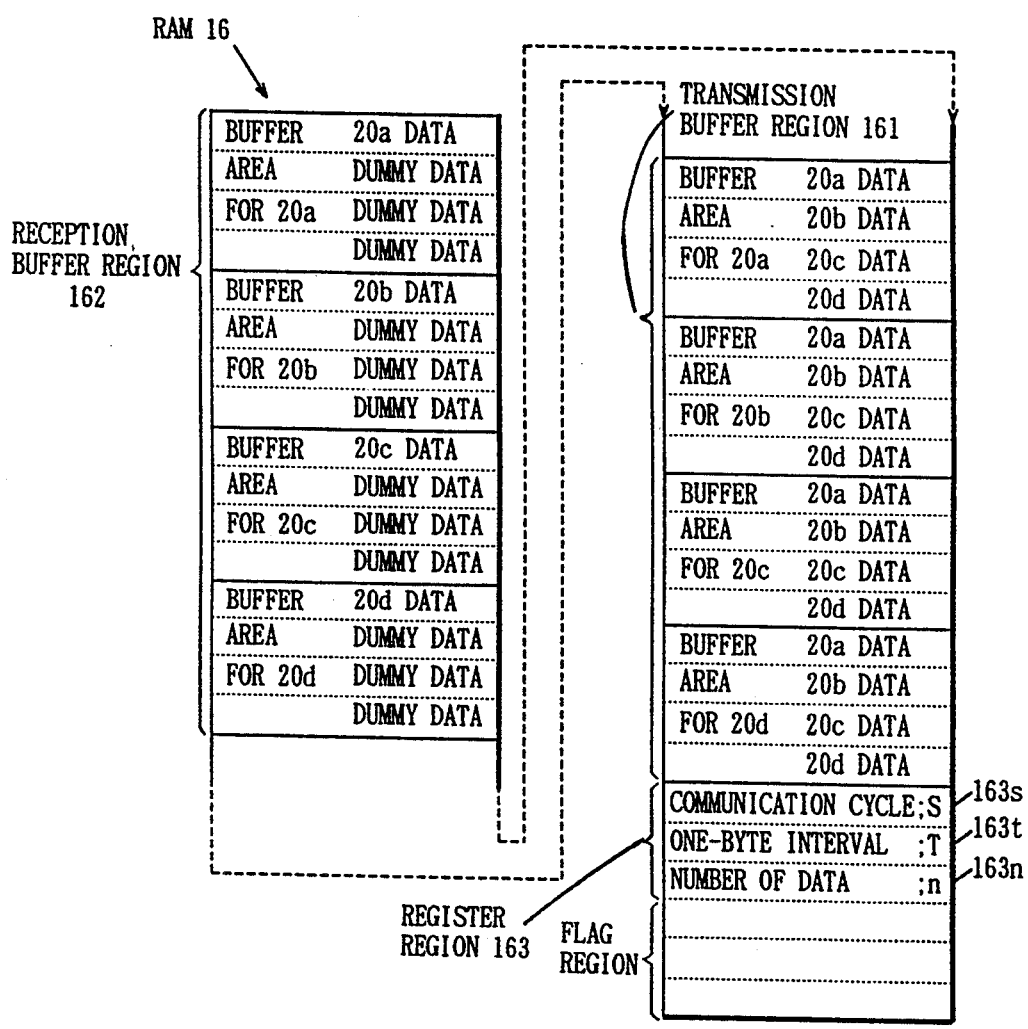
FIG. 4 is a diagram showing a memory of a RAM (transmit/receive data temporary storing means) included in the communication adaptor.

The RAM 16 is used as an input/output buffer or a transmission/reception buffer for temporary storing input/output data. More specifically, the RAM 16 comprises a transmission buffer region 161, a reception buffer region 162, a register region 163, and a flag region 164, as shown in FIG. 4. The transmission buffer region 161 stores respective 1-byte data on the game in the game sets 20a to 20d by four bytes (four bytes to be transmitted during a period of eight clock signals from terminals corresponding to respective bits in an output port 182) for each game set and has a storage capacity of at least 4×4=16 bytes. Similarly, the reception buffer region 162 stores respective 1-byte data on the game in the game sets 20a to 20d by four bytes (four bytes received during a period of eight clock signals to terminals corresponding to respective bits in an input port 181) for each game set and has a storage capacity of at least 4×4=16 bytes. The register region 163 comprises, for example, a register 163s for temporarily storing communication cycle data (S), a register 163t for temporarily storing data (T) for controlling one byte and one-byte intervals, and a register 163n for temporarily storing the number of data (n). The flag region 164 comprises a timer interruption flag, a mode flag and the like.

Furthermore, a clock oscillator 17, the input port 181, the output port 182, and a clock output port 183 are connected to the CPU 14. The clock oscillator 17 generates a reference clock signal having a frequency correlated with a machine cycle of the CPU 14 to apply the same to the CPU 14. The CPU 14 operates in a cycle based on the reference clock signal, and generates one pulse of a clock signal for synchronization of the transmission/reception timing to apply the same to the connecting terminal 13a and the connector 13b to 13d corresponding to the game sets 20a to 20d every time it outputs 1-bit transmit data or receives receive data. Consequently, the clock oscillator 17 and the CPU 14 constitute an exemplary clock signal generating means.

The input port 181 has portions for storing four bits respectively corresponding to the game sets 20a to 20d (for example, the storing portions of the input port may be flip-flops). The input port 181 temporarily stores in the storing portions data transmitted serially by bit from the game sets 20a to 20d through the respective first terminals (not shown) of the connecting terminal 13a and the connectors 13b to 13d. Similarly, the output port 182 has portions for storing four bits and, temporarily stores in the storing portions data to be transmitted serially by bit to the game sets 20a to 20d, and transmits the data to the game sets 20a to 20d serially by bit through the respective second terminals (not shown) of the connecting terminal 13a and the connectors 13b to 13d. The clock output port 183 has portions for storing four bits, and alternately stores in the storing portions logic "1" and logic "0" in synchronization with the transmission/reception cycle of 1-bit data to supply a clock signal synchronized with the transmission/reception timing to the game sets 20a to 20d through the respective third terminals (not shown) of the connecting terminal 13a and the connectors 13b to 13d.

Furthermore, a timer 19 constituted by a hardware circuit (hereinafter referred to as "hardware timer") 19 capable of presetting its set time for determining a communication cycle. The CPU 14 also has a software timer function so as to determined one-byte intervals (time T) by program processing.

Figure 5:
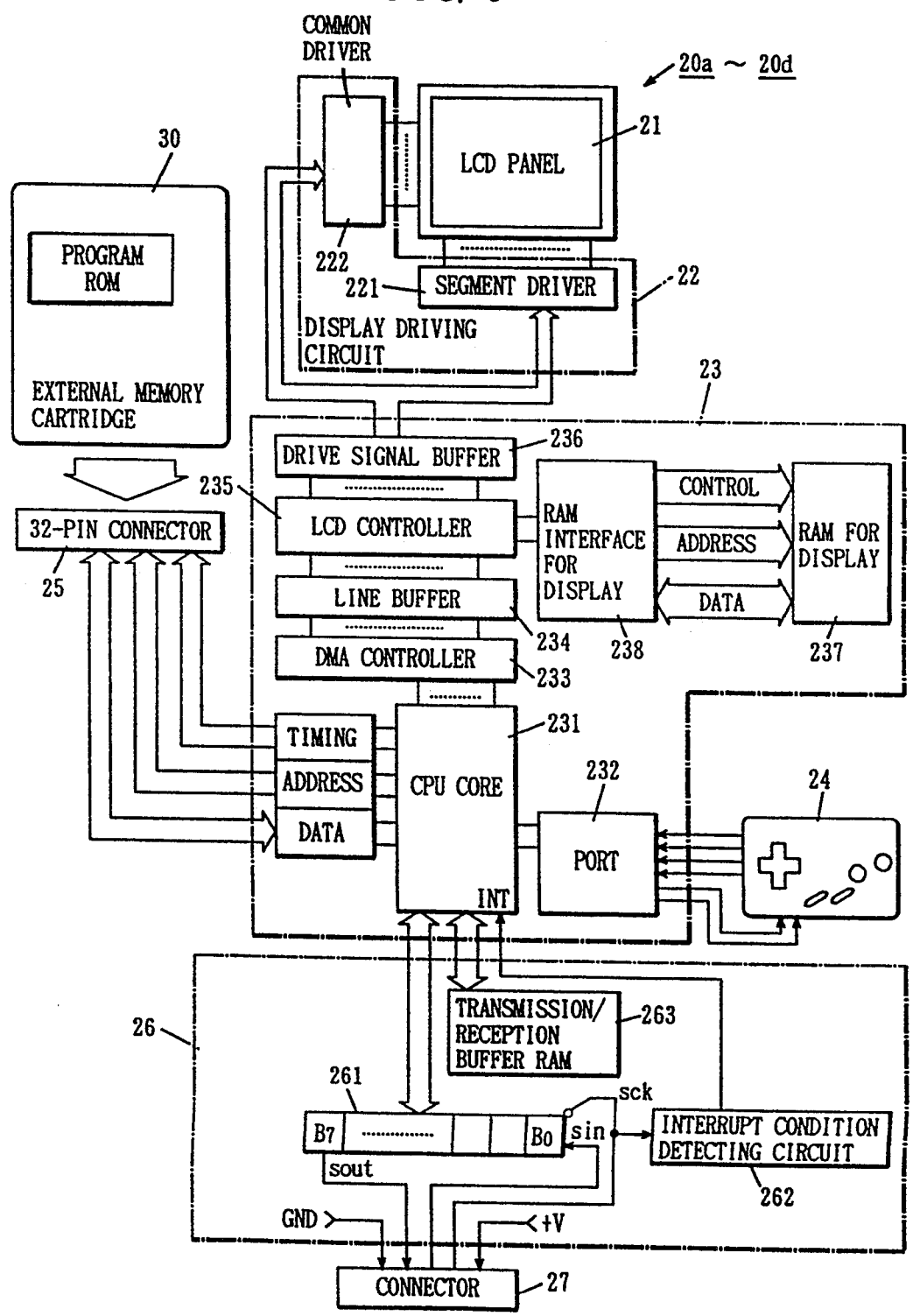
FIG. 5 is a block diagram showing one example of a game set connected to the communication adaptor.

FIG. 5 is a block diagram showing each of the game sets connected to the communication adaptor. Each of the game sets 20a to 20d comprises a liquid crystal display (LCD) 21, a display driving circuit 22, a display control circuit 23, an operator control portion 24, a connector 25, and a communication control circuit 26. An external memory cartridge 30 storing various program data for game control, display control and communication control is detachably connected to the connector 25 in each of the game sets 20a to 20d.

The liquid crystal display 21 is of, for example, a dot matrix type and is driven by a segment driver 221 and a common driver 222 included in the display driving circuit 22. The display control circuit 23 comprises a CPU core 231, and input/output port 232, a direct memory access (DMA) controller 233, a line buffer 234, an LCD controller 235, an LCD drive signal buffer 236, a display RAM 237, and a RAM interface 238. The details of the circuits and their interrelationship are described in Japanese Patent Publication No. 4453/1989 (Japanese Patent Laid-Open Gazette No. 210562/1990) and U.S. application Ser. No. 07/462,491, now U.S. Pat. No. 5,095,798 issued on Mar. 17, 1992, which are related to the application of the present applicant and are hereby incorporated by reference herein.

The communication control circuit 26 comprises a shift register 261, an interrupt condition detecting circuit 262, and a transmission and reception buffer RAM 263. The shift register 261 performs a shifting operation in response to a clock signal (SCK) from the communication adaptor 10, and serves to load 1-byte transmit/receive data in parallel and convert the transmit/receive data into bit serial data to output the same under the control of the CPU core 231 or to convert the input serial data into parallel data while shifting the serial data to apply the same to the CPU core 231. The interrupt condition detecting circuit 262 generates an interrupt signal every time eight clock signals (SCK) are applied (that is, 1-byte data is transmitted and received), to apply the same to the CPU core 231. The transmission/reception buffer RAM 263 comprises a reception buffer region and a transmission buffer region. The reception buffer region and the transmission buffer region respectively comprise bytes whose number corresponds to the number of the game sets connected to the communication adaptor 10 (for example, four bytes). In addition, a connector 27 is provided in relation to the communication control circuit 26, and terminals of the connector 27 are respectively connected to the most significant bit, the least significant bit, and a clock signal (SCK) line of the shift register 261.

Figure 6A:
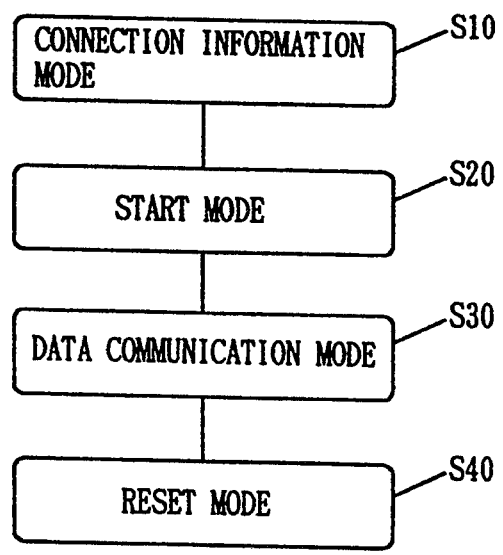

FIGS. 6A and 6B are diagrams illustrating the state where data communication is established between the communication adaptor and the game sets, where FIG. 6A shows operation modes of the communication adaptor, and FIG. 6B shows the relationship between each of the RAM areas for storing transmit/receive data and the flow of data in the state where data communication is established.

A single transmission results in each of the game sets only receiving data regarding one game set. Accordingly, communication must be repeated four times so as to exchange data of one byte on each of the four game sets between the game sets. Each of the game sets transmits data of one byte, while receiving data of four bytes. Transmission and reception are simultaneously made. Accordingly, each of the respective game sets transmits actual data of one byte and dummy data (in which eight bits are all zero) of three bytes, to obtain data on the four game sets.

In FIG. 6B, parts corresponding to the first byte, the second byte, the third byte, and the fourth byte in the flow of the transmit/receive data are respectively indicated by a thick line, a thin line, a dotted line, and a one-dot and dash line.

The operation modes will be schematically described with reference to FIG. 6A. when power is turned on, that is, the cord with a plug 12 is connected to the connector 27 in the game set 20a, the CPU 14 in the communication adaptor 10 executes a connection information mode routine (which will be described in detail with reference to FIG. 7C and FIGS. 9A to 9C as described later) so as to confirm the connecting state. When any one of the game sets 20a to 20d is connected to the communication adaptor 10 and the game is started, the CPU 14 executes a start mode routine (which will be described in detail with reference to FIG. 7D and FIGS. 10A and 10B as described later). During a period of the game, the CPU 14 executes a data communication mode routine (which will be described in detail with reference to FIG. 7E and FIG. 11A and 11B as described later). In addition, when it is desired to reset the game set during the game, for example, when it is desired to play the game again from the beginning without turning off power, the CPU 14 executes a reset mode routine (which will be described in detail with reference to FIG. 7F and FIGS. 12A and 12B as described later).

Referring to FIG. 6B, transmit data representing the game state required, for example, for the battle game is stored in the first byte in an area corresponding to each of the game sets 20a to 20d in the RAM (transmission buffer region) 263.

Transmit data of one byte for each of the game sets 20a to 20d is bit serial data arranged in the order from B0 to B7, and corresponding bit data for the game sets 20a to 20d are respectively transmitted through the first terminals of the connecting terminal 13a and the connectors 13b to 13d in parallel by four bits. This operation is performed eight times, thereby to transmit 1-byte data. This data is read by the CPU 14, and is format-converted into data of one byte comprising eight bits by the CPU 14 based on a program stored in the ROM 15, to be written into a corresponding area in the reception buffer region 162.

This operation is repeated until transmit data of four bytes are transmitted.

However, data in the second to fourth bytes are dummy data in which eight bits are all zero, for example, when data in communication established once is only one byte. The foregoing is one cycle of communication.

Such a series of operations will be described in more detail. First, transmit data of only one byte are respectively sent from the game sets 20a to 20d to the first terminals of the connecting terminal 13a and the connectors 13b to 13d. Each of the transmit data is transmitted one bit at a time from its least significant bit. Since four game sets are connected to a communication adaptor in the present embodiment, transmit data of a total of four bits are input. The transmit data of four bits are input once through the first terminals of the terminal 13a and the connectors 13b to 13d in storing portions, e.g., flip-flops, directly connected to the connecting terminal and the connectors. That is, only the respective least significant bits of data on the four game set are input as a collection of four bits in the storing portions. Thereafter, the respective one bits are format-converted into parallel data, and are further stored again in the receive data temporary storing means. When this task is terminated, the respective second least significant bits are transmitted from the game sets in the same manner as the previous process. The bits are input as a collection of four bits, and the respective one bits are format-converted into parallel data and then, are stored again in the receive data temporary storing means in the same manner as the previous process. This process is repeated eight times, to constitute one cycle of communication. As a result, 8-bit (1-byte) data is transmitted from each of the game sets, and 1-byte data sent from each of the game sets is stored as parallel data in the receive data temporary storing means.

Thereafter, the receive data in the reception buffer region 162 are transmitted or written by the CPU 14 into receptive addresses in areas for the game sets 20a to 20d in the transmission buffer region 161. At this time, data representing the state of the battle game of the four game sets 20a to 20d is required in each of the game sets. Accordingly, in order to transmit the received data on the four game sets to the four game sets by the transmission of the 4-byte data, the CPU 14 respectively writes data for 20a, data for 20b, data for 20c, and data for 20d into the first byte, the second byte, the third byte and the fourth byte in areas corresponding to the game sets 20a to 20d in the transmission buffer region 161. Since the same data must be transmitted to the four game sets, the same data are respectively stored into the areas corresponding to the game sets 20a to 20d in the transmission buffer region 161.

Thereafter, data in each of the first to fourth bytes in an area corresponding to each of the game sets in the transmission buffer region 161 is transmitted to each of the games sets 20a to 20d serially (that is, in the order of B0, B1, . . . , B7, . . . in the first byte for the game sets 20a to 20d, . . . , and B0, B1, . . . B7, . . . in the fourth byte for the game sets 20a to 20d) in the order from the first to the fourth bytes. The data thus received is stored in the reception buffer region 162 in the transmission/reception buffer RAM 263 on the side of each of the game sets 20a to 20d.

Figure 7A:
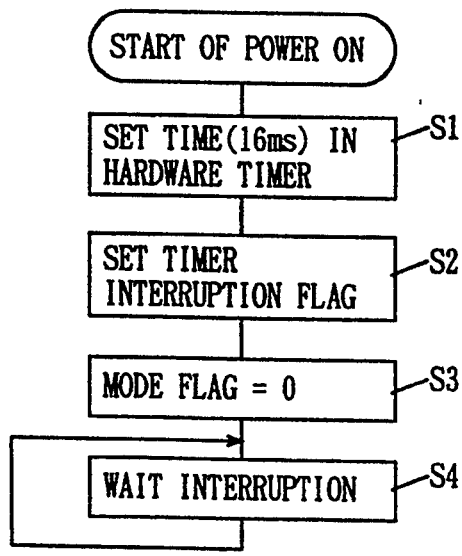
FIGS. 7A to 7F are flowcharts illustrating the operations of the communication adaptor, where
Figure 7B:
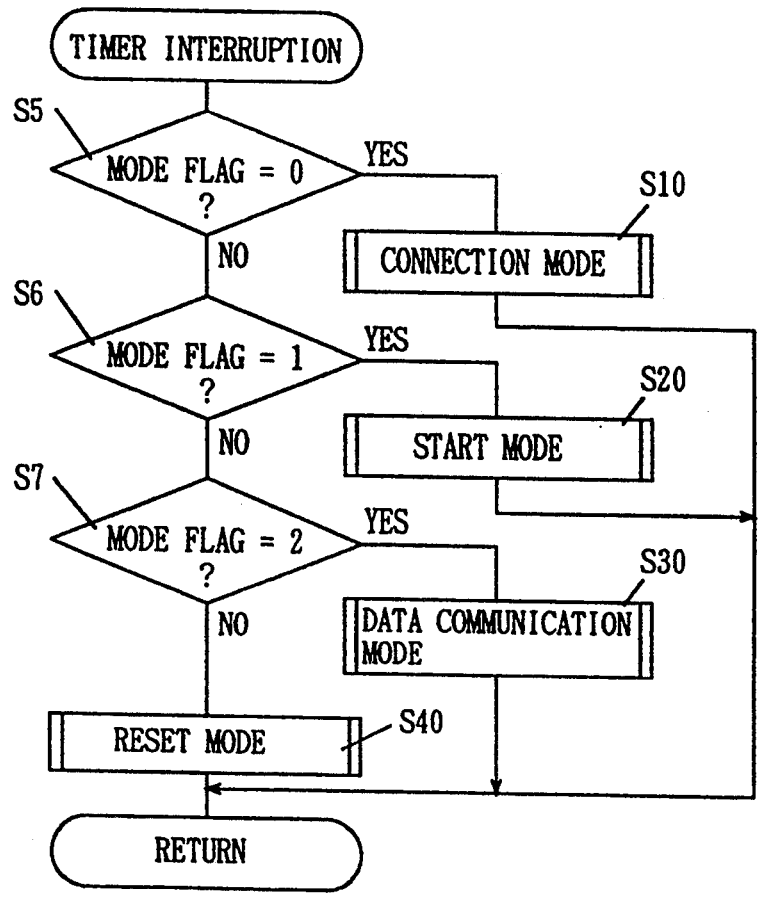
Figure 7C:
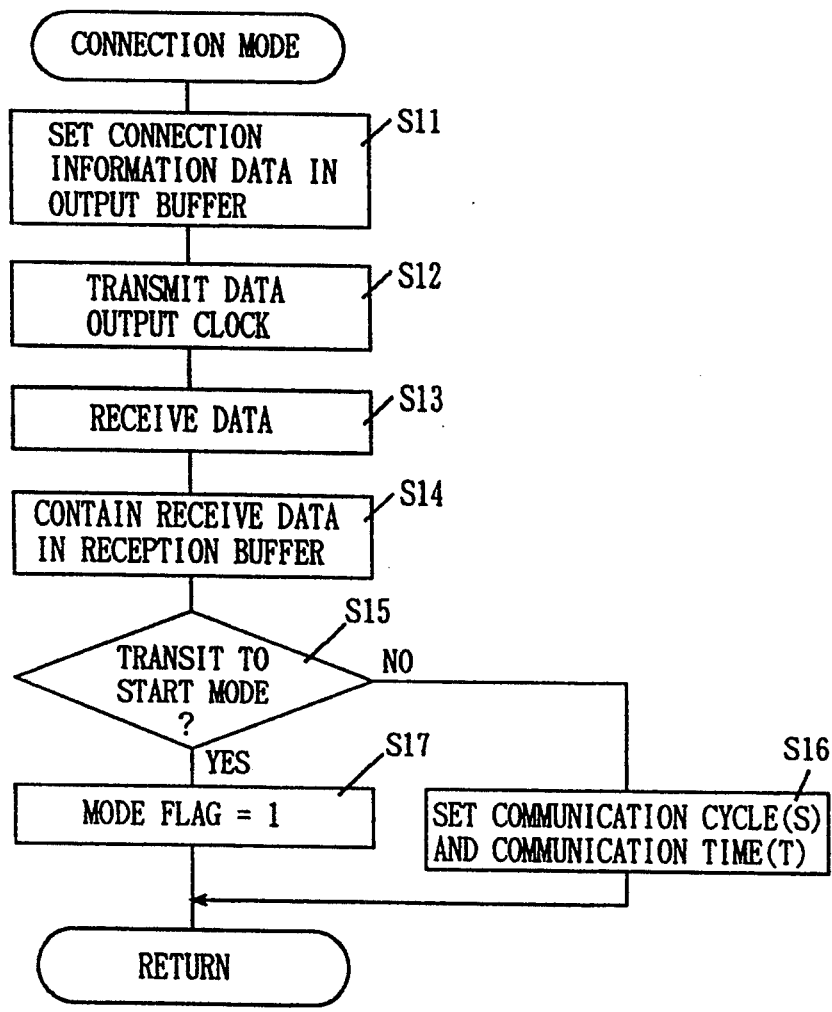
Figure 7D:
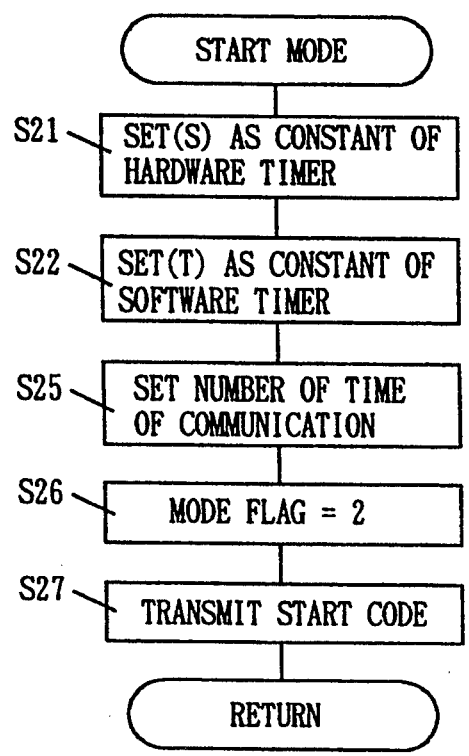
Figure 7E:
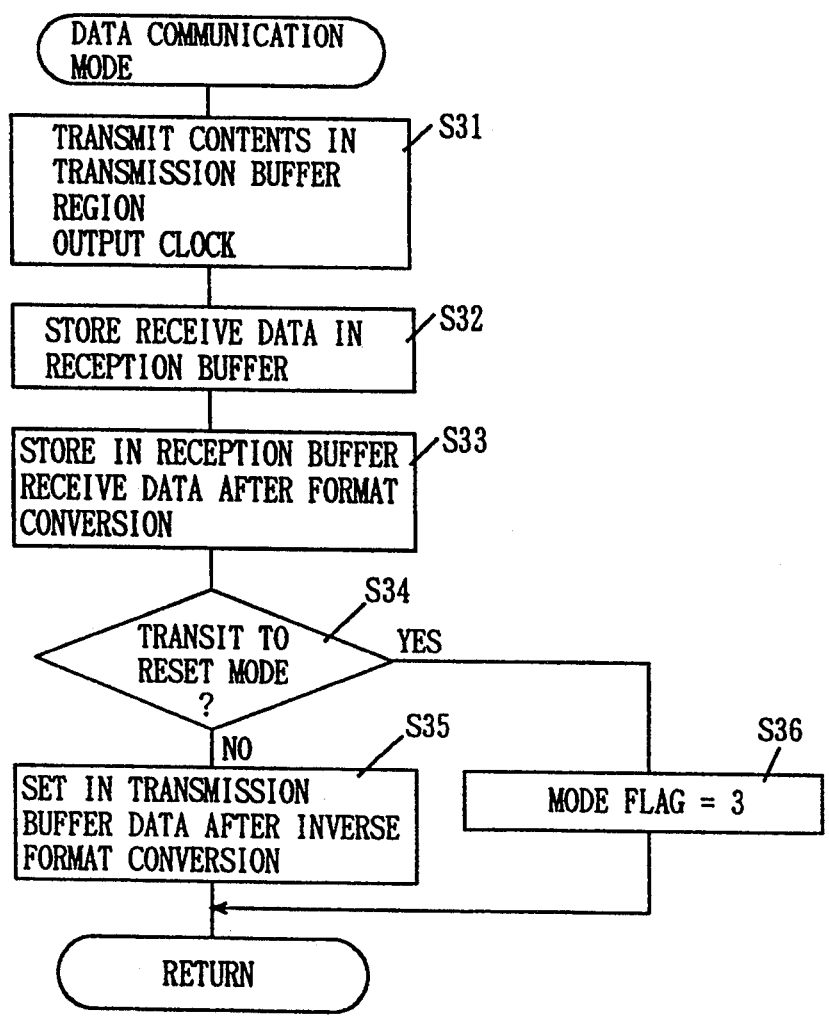
Figure 7F:
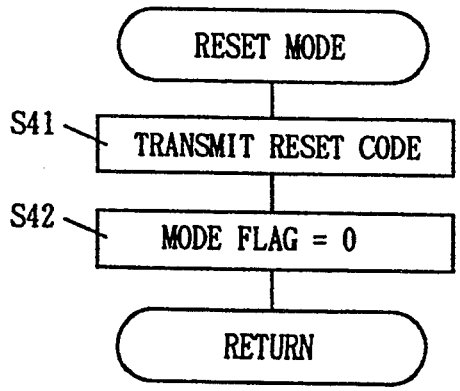

FIGS. 7A to 7F are flow charts for explaining operations of the communication adaptor, where FIG. 7A shows an operation where power is turned on, FIG. 7B shows an operation at the time of a timer interruption, FIG. 7C shows an operation at the time of a connection information mode, FIG. 7D shows an operation at the time of a start mode, FIG. 7E shows an operation at the time of a data communication mode, and FIG. 7F shows an operation at the time of a reset mode.

Figure 8A:
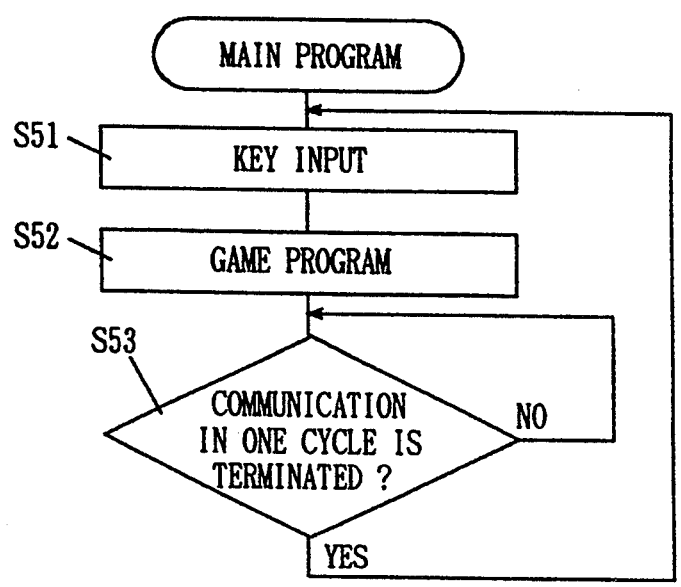
FIGS. 8A to 8B are flowcharts related to a communicating operation on the side of the game set, where
Figure 8B:
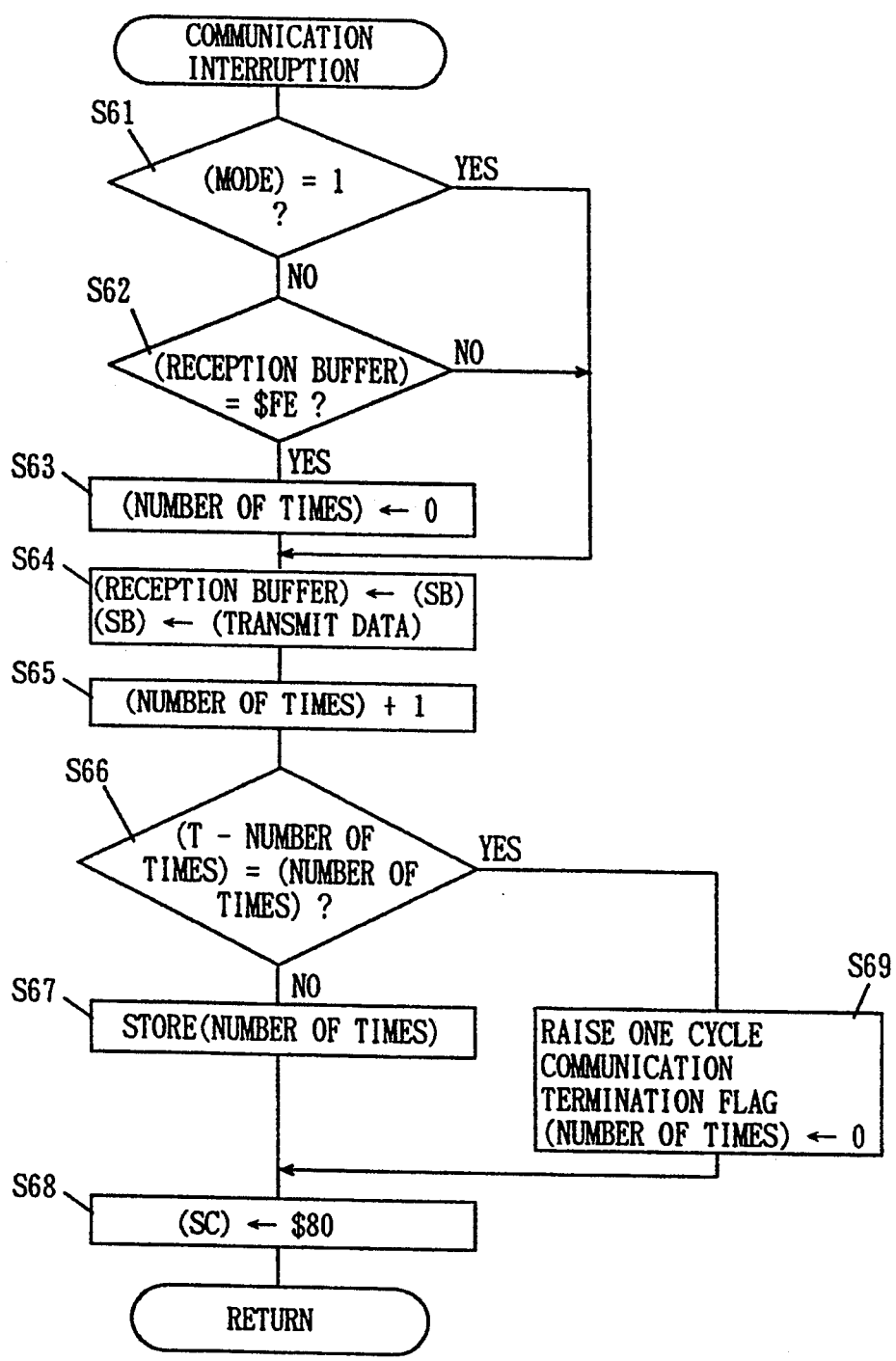

FIGS. 8A to 8B are flow charts for explaining the communicating operation of the game set, where FIG. 8A shows a main program operation, and FIG. 8B shows an operation at the time of an SIO interruption.

Figure 10A:
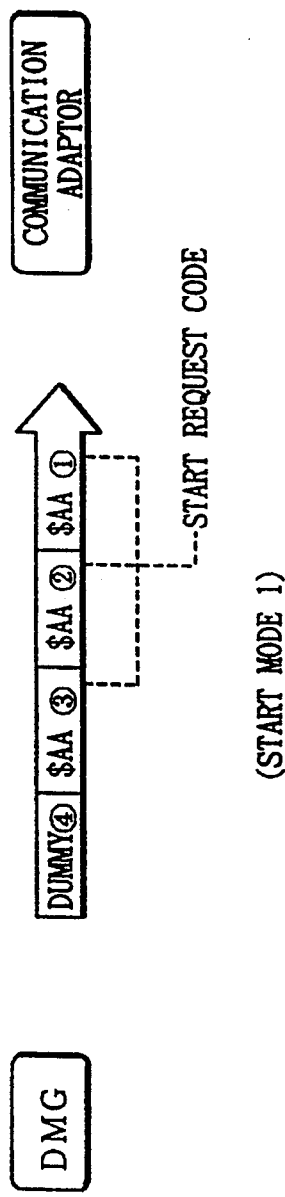
FIGS. 10A and 10B show a data format in a start mode.
Figure 10B:
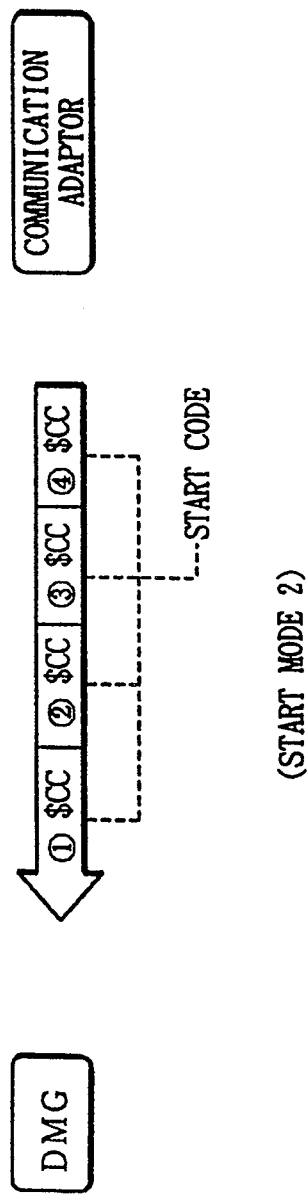
Figure 12B:
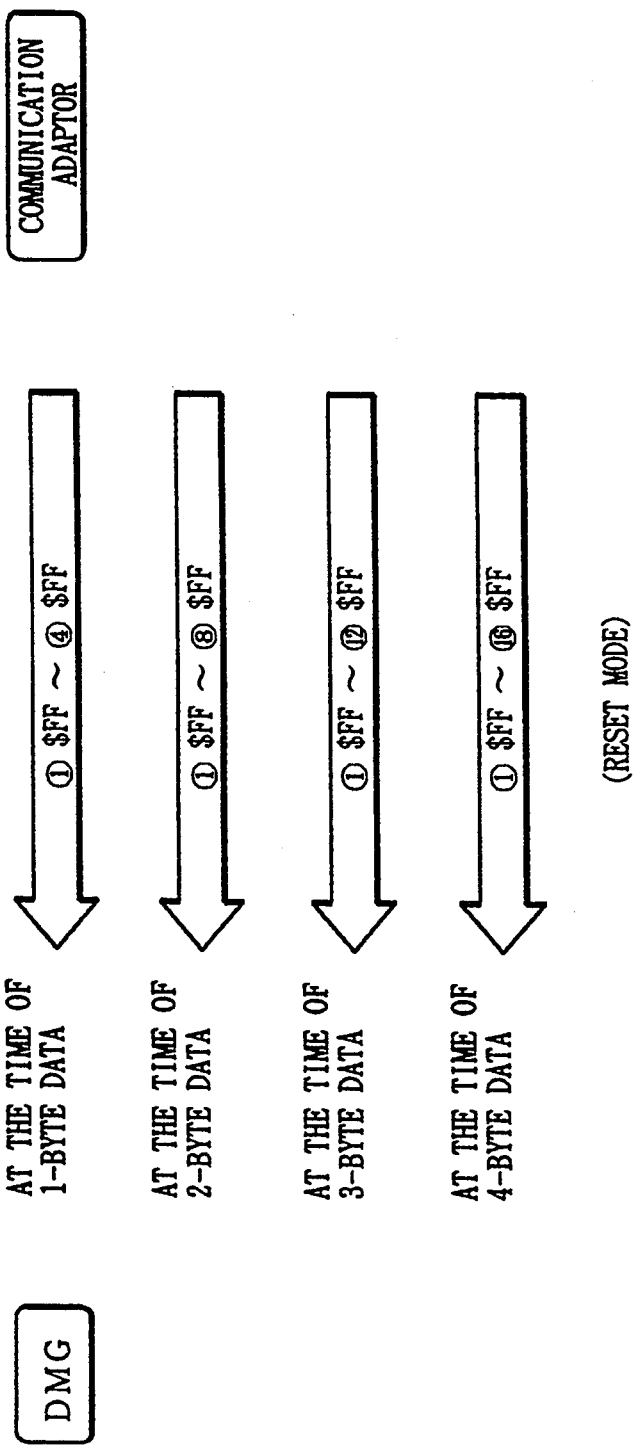

FIG. 9A to 12B are illustrations of a data format for each mode, FIGS. 9A to 9C show a format in a connection information mode, FIGS. 10A and 10B show a format in a start mode FIGS. 11A to 11B show a format in a data communication mode, and FIGS. 12A and 12B show a format in a reset mode.

Description is now made of operations performed when data communication is established between the communication adaptor and the game sets for each mode.

(1) Power on processing and timer interruption processing:

When the plug of the cord 12 is inserted into the game set 20a so that a power switch (not shown) of the game set 20a is turned on, power is supplied to the communication adaptor 10. Correspondingly, the CPU 14 starts an operation performed when power is turned on as shown in FIG. 7A. That is, in the step (abbreviated as "S" in the drawings) 1, a communication cycle (S) time is set in the hardware timer 19. In the subsequent step 2, a timer interruption flag is set. In the step 3, zero is set in a mode flag. In the step 4, the CPU 14 waits until a timer interruption occurs.

(2) Connection information mode:

If a timer interruption occurs while the CPU 14 waits in the step 4, the program proceeds to timer interruption processing shown in FIG. 7B. That is, it is determined in step 5 whether or not the mode flag is zero. Since the mode flag is zero immediately after power is turned on, a connection information mode routine is executed in the step 10 (see FIG. 7C). The processing in this connection information mode is performed for the purpose of transmitting and receiving data between only the game sets requiring transmission and reception by knowing which of the connecting terminal 13a and the connectors 13b to 13d is connected to each of the game sets 20a to 20d.

More specifically, in the step 11, connection information data to be transmitted to each of the game sets 20a to 20d as shown in FIG. 9A is set in the transmission (output) buffer region 161. A combination which corresponds to three bits of data for determining which of the connecting terminal 13a and the connectors 20b to 20d is connected to each of the game sets 20a to 20d and data for determining which of the connecting terminal and the connectors is connected to the game set at the present time is added behind a head end code (a code indicating the head end of data; FE in hexadecimal notation: which is marked with a $ sign in front of data in hexadecimal notation in the drawings) (the same data is sent three times). In this 1-byte data, high order digits in hexadecimal notation, that is, high order four bits D4 to D7 correspond to the game sets 20a to 20d, and each of the game sets is connected to the communication adaptor 10 when each of the bits is "1" while not being connected to the communication adaptor 10 when it is "0". Low order digits in hexadecimal notation, that is, low order four bits designate the game sets 20a to 20d using binary numbers.

In the step 12, connection information data (see FIG. 9c) set to four bytes in the area corresponding to the game set 20a in the transmission buffer region 161 is first format-converted, to be applied to the connector 27 in each of the game sets through the output port 183 and the connecting terminal 13a serially by bit. At this time, the CPU 14 generates one clock signal (SCK) for synchronization of the transmission/reception timing every time it transmits 1-bit data, to apply the same to each of the storing portions in the clock output port 182. Correspondingly, the clock signal is applied to the connector 27 in the game set 20a through the connecting terminal 13a. Consequently, data in the shift register 261 in the game set 20a is shifted one bit, and the interrupt condition detecting circuit 262 is incremented by one. When this operation is performed eight times (by one byte), the interrupt condition detecting circuit 262 generates an interrupt signal in response to the detection of eight clock signals, to apply the same to the CPU core 231. Correspondingly, the game set connected performs processing shown in FIG. 8B, the details of which will be described later.

In the above-described manner, when the transmission of the 4-byte connection information data to be transmitted to the game set 20a is terminated, connection information data are sequentially transmitted to the other game sets 20b to 20d in the same manner and then, the program proceeds to the next step 13.

In the step 13, each of the game sets 20a to 20d transmits to the communication adapter 10 4-byte data comprising a connection recognition code ($88) of two bytes, a connect time code (a code designating time T at one-byte intervals for communication) and a communication cycle (time required to terminate communication once) S, a code designating the number of bytes of data to be transmitted by each of the game sets in communication established once (any one of 1 to 4 which is the same in all the game sets) so as to inform that one's own is connected in response to the reception of the connection information data (see FIG. 9B). When the input port 181 receives the data, the CPU 14 format-converts the receive data and writes the same into the area corresponding to the game set 20a in the reception buffer region 162, thereby to store the receive data (step 14).

It is determined in the subsequent step 15 whether or not the transition to the start mode is to be made. If start mode is not initiated, communication cycle data (S) and communication time data (T) are set in the register region 163 in the step 16 and then, the program is returned to the normal operation step (the step 4).

If there is a start request code (for example, $AA; see FIG. 10A), after a timer interruption operation is repeated several times, it is determined in the above described step 15 that the transition to the start mode is to be made, so that 1 is set in the mode flag in the subsequent step 17.

(3) Start mode

When a timer interruption occurs while the CPU 14 waits in the above described step 4, if it is determined in step 5 that the mode flag is not zero, the program proceeds to the step 6. If it is determined in step 6 that the mode flag is 1, the program proceeds to a start mode subroutine (the step 20).

In the start mode, the communication cycle data S is set in the hardware time 19 as a predetermined constant of the hardware timer in the step 21, as shown in FIG. 7D. In the subsequent step 22, the communication time data T is set as a predetermined constant of a software timer. In addition, the constant S of the hardware timer 19 and the constant T of the software timer are selected to be $S > T$ n when n is taken as the number of times of communication (where n is any one of 4, 8, 12 and 16). The reason for this is that a communication cycle time (time elapsed until communication is terminated n times) is determinedly the constant (S) of the hardware timer, and time required to establish communication once is determined by the constant (T) of the software timer. More specifically, assuming that the time (T) required to establish communication once is 1 ms, n is any one of 4, 8, 12 and 16. Accordingly, the value of S is necessarily not less than 4, 8, 12 or 16 with respect to n. Unless the value is thus set, the communication cycle is terminated before communication is terminated a required number of times, so that the game sets determine that communication is terminated before the communication is entirely terminated, resulting in asynchronizaton between the game sets and the communication adaptor.

In the step 25, data indicative of the number of times of communication (n) is set in the register. In the subsequent step 26, 2 is set in the mode flag, to specify the execution of the data communication mode. In step 27, start codes (for example, $CC codes of four bytes) shown in FIG. 10B are transmitted. Thereafter, the program is returned to the step 4.

(4) Data communication mode

If a timer interruption occurs while the CPU 14 waits in the above-described step 4 and if it is determined in step 5 that the mode flag is not zero, and if it is determined in step 6 that the mode flag is not 1, the program proceeds to step 7. If it is determined in step 7 that the mode flag is 2, the program proceeds to a data communication mode subroutine (the step 30).

In the data communication mode, transmit data (see FIG. 11B) related, for example, to the battle game in the transmission buffer region 161 is transmitted and at the same time, a clock signal is output every time 1-bit data is transmitted in the step 31, as shown in FIG. 7E, in the same manner as that in the above described step 12 in the connection information mode. In this data communication, the order of transmission is changed as shown in FIG. 11B depending whether the data to be transmitted is one to four bytes long.

In the next step 32, each of the game sets 20a to 20d transmits data shown in FIG. 11A to the communication adaptor 10 in response to the reception of the data related to the game. In this case, each of the game sets adds dummy data having no meaning behind the data related to the game to adapt the number of bytes of the transmit data to a predetermined type. However, the type differs depending on whether the data is one to four bytes long. In response thereto, the CPU 14 in the communication adaptor 10 receives the transmit data from the game set.

In the step 33, the CPU 14 converts the receive data into a format writable into the RAM 16 and then, stores the same in the reception buffer region 162 as shown in FIG. 6B.

It is determined in the subsequent step 34 whether or not the transition to the reset mode is to be made. If not, the data in the reception buffer region 162 is inversely format-converted to be written into the transmission buffer region 161 in the step 35 and then, the program is returned. The data written into the transmission buffer region 161 is transmitted to each of the game sets in the next timer interruption timing in repeating the above-described step 31 again.

When a player using any one of the game sets operates a reset switch (not shown) so that a reset request code (for example, $FF; see FIG. 12A) is transmitted, it is determined in the above described step 34 that the reset request code is transmitted, so that the program proceeds to the step 36. In step 36, 3 is set in the mode flag and then, the program is returned.

(5) Reset mode

If a timer interruption occurs again while the CPU 14 waits in the above described step 4, the program proceeds to timer interruption processing. At this time, when it is determined in step 7 that the mode flag is not 2, after the steps 5 and 6, the program proceeds to the reset mode in the step 40.

In the reset mode, the CPU 14 transmits a reset code ($FF) as shown in FIG. 12B to each of the game sets 20a to 20d in the step 41 (see FIG. 7F). Subsequently, zero is set in the mode flag in the step 42 and then, the program is returned. Consequently, when a reset request occurs, the program is resumed from the above described connection information mode in the timer interruption processing.

(6) Operation on the side of game sets

Although the operation of each of the game sets 20a to 20d was briefly described in relation to the description of the operations of the communication adaptor 10, the details of the game set operation related to communication will be described with reference to FIGS. 8A and 8B.

Each of the game sets 20a to 20d generally executes a main program shown in FIG. 8A. More specifically, in the step 51, the game set reads data representing a state where a key included in the operation portion 24 is operated (key input state). In the subsequent step 52, the CPU core 231 performs game processing on the basis of program data in a ROM included in the external memory cartridge 30. Presuming, for example, that the program data is for the battle game, data for the battle game must be transmitted and received to and from the other game sets through the communication adaptor 10 so that the game state of the other players is known. Therefore, the CPU core 231 writes its own transmit data into the transmission buffer region 161. Thereafter, it is determined in the step 53 whether or not communication in one cycle is terminated. If it is determined that the communication is not terminated, the CPU core 231 waits until the termination of the communication is detected. If a communication interruption occurs from the communication adaptor 10 in this state, the program proceeds to communication interruption processing shown in FIG. 8B.

In the communication interruption processing, it is determined in step 61 whether or not the contents of the mode register are 1. The program proceeds to step 62 if the contents of the mode register are not 1, while proceeding to step 64 if the contents of the mode register are 1. It is determined in step 62 whether or not the reset code ($FF) is stored in the reception buffer region 162. If there is no reset code, the program proceeds to step 64. On the other hand, if the reset code is stored, the register storing the number of times of communication (hereinafter referred to as communication number register) is reset (the value of n is set to zero) in step 63 and then, the program proceeds to step 64.

In step 64, receive data is written into the transmission buffer region 161 in the transmission/reception buffer RAM 263 or transmit data to be transmitted to the communication adaptor 10 is written into the reception buffer region 162 therein. In the subsequent step 65, 1 is added to the contents of the communication number register. Thereafter, it is determined in step 66 whether or not the contents of the communication number register coincide with the number of times of communication (n) applied from the communication adaptor 10. If both do not coincide, data on the number of times of communication is stored in step 67, and a code instructing waiting for reception to the CPU core 231 ($80) is written into the register in step 68 and then, the program is returned to step 53.

When a communication interruption occurs while the CPU core 231 waits in step 53 so that the communicating operation is performed a designated number of times while the operation in steps 61 to 68 is repeated, and if it is determined in step 66 that both coincide with each other, so that the program proceeds to step 69. In the step 69, zero is set in the communication number register, thereby to raise a communication termination flag to indicate that communication in one cycle is terminated. Subsequently, when step 68 is carried out, the program is returned to step 53, it is determined that communication in one cycle is terminated, so that the program is returned to step 51. Steps 51 and 52 are repeated for each communication in one cycle.

Although description was made of a case where four game sets are connected to the communication adaptor, it is needless to say that data is not transmitted and received to and from the game set which is not connected to the communication adaptor because transmit data is not written into a buffer area corresponding to the game set.

Although description was made of a case where the present invention is applied to a portable game set, the present invention is not limited thereto. For example, the present invention is applicable to a home television game set and the like.

Although the present invention has been described and illustrated in detail, it should be understood that the same is by way of illustration and example only and is not to be taken to be a limitation on the present invention.

We claim:

1. A communication adaptor for use with a plurality of game sets each provided with a first connecting means for inputting and outputting data on the state of a game and each game set including a buffer memory for temporarily storing transmit/receive game state data of the game states of the other game sets connected thereto, and for transmitting and receiving game state data to and from the plurality of game sets, said communication adaptor comprising:

a housing;

a plurality of second connecting means provided for said housing and each including at least a first terminal, a second terminal and a third terminal, each second connecting means including at least a said first, second and third terminal being connected to an associated first connecting means in one of the plurality of game sets;

a data input port connected to the first terminals for storing bits whose number correspond to the number of said plurality of second connecting means, the bits being stored corresponding to the bits received from the first terminals included in the second connecting means, said bits being related to the game states of the game sets;

a data output port connected to the second terminals for storing bits whose number correspond to the number of said plurality of second connecting means, the bits being stored corresponding to the bits to be transmitted to the second terminals included in the second connecting means;

a clock output port connected to the third terminals for storing bits whose number correspond to the number of said plurality of second connecting means, the bits being stored corresponding to the bits connected to the third terminals included in the second connecting means, clock signal generating means for applying the same clock signal used for data communication with said game sets to said clock output port;

transmit/receive data temporary storing means for storing transmit game state data on the game to be transmitted to each of said game sets and receive game state data on the game received from each of the game sets in synchronization with said clock signal;

format converting means for converting bit serial data received from each of said game sets into bit parallel data and for converting bit parallel data to be transmitted into bit serial data;

receive data writing means for writing into said transmit/receive data temporary storing means corresponding data out of said data input port which are received from each of said game sets and after being format-converted by said format converting means in synchronization with said clock signal; and transmit data supplying means for reading out the transmit game state data stored in the transmit/receive data temporary storing means to supply the same to said data output port after being converted by said format converting means so as to transmit the transmit data stored in said transmit/receive data temporary storing means to each of said game sets in synchronization with said clock signal.

2. The communication adaptor for a game set according to claim 1, wherein said transmit/receive data temporary storing means comprises a transmission buffer region and a reception buffer region, said reception buffer region including buffer areas respectively corresponding to said plurality of game sets, each of the buffer areas having a location storing the transmitted game state data from one game set and locations storing dummy data corresponding to the other game sets.

3. The communication adaptor according to claim 2, wherein said transmission buffer region includes buffer areas respectively corresponding to said plurality of game sets, each of the buffer areas being divided into locations storing transmit game state data for the respective game sets.

4. A communication adaptor for use with a plurality of gaming devices, each gaming device having a game central processing means for executing a game program and for generating data indicative of a predetermined game state, said adaptor being connected to said plural gaming devices for communicating said predetermined game state data of each gaming device among said plurality of gaming devices, said adaptor comprising: a housing having a plurality of external connector ports, each port being coupled to an associated one of said gaming devices;

a random access memory partitioned into transmit/receive buffer areas for storing transmission and reception game state data for each of said plurality of gaming devices;

input/output means coupled to said plurality of external connector ports for receiving serial game state data therefrom and transmitting serial game state data thereto;

adaptor processing means coupled to said input/output means for processing serial game state data received from said plurality of gaming devices and for writing said processed data in parallel into said random access memory and including means for reading game state data out of said random access memory and converting said data for serial transmission to a plurality of said gaming devices.

5. A communication adaptor according to claim 4 wherein said gaming devices are hand held devices, each having a dot matrix liquid crystal display.

6. A communication adaptor according to claim 4, further including a program memory coupled to said adaptor processing means and a hardware timer coupled to said adaptor processing means.

7. A communication adaptor according to claim 4, wherein said input/output means includes an input port having means for storing serial game state data received from said plurality of game devices and an output port having means for storing serial game state data to be transmitted to a plurality of game devices.

8. A communication adaptor according to claim 4, wherein each of said plurality of external connector ports includes a first terminal for receiving input serial game state data from the gaming devices, a second terminal for transmitting output serial game state data to the gaming devices and a third terminal for receiving a clock signal from said adaptor processing means.

* * * * *